UNITED STATES PATENT OFFICE.

HENRY LOEWENBERG, OF NEW YORK, N. Y.

IMPROVEMENT IN IMITATION BRAIDS, TRIMMINGS, LEATHERS, &c.

Specification forming part of Letters Patent No. 106,068, dated August 2, 1870; reissue No. 4,444, dated June 27, 1871.

*To all whom it may concern:*

Be it known that I, HENRY LOEWENBERG, of the city, county, and State of New York, have invented a new and useful Improvement in the Manufacture of Imitation Straw-Braids, Trimmings, &c.; and I do hereby declare the following to be a full, clear, and exact description thereof, which will enable those skilled in the art to make and use the same.

This invention relates to an improvement in flexible or elastic casts forming fac-similes of natural or artificial objects, such as straw goods, leather, leather goods, leather cloth, woven goods, leaves, wood ornaments or works of art, by a process which I term velociplastic.

In carrying out my invention I take the article from which a fac-simile is to be produced and make a mold by casting over said article a compound of glue or gelatinous material, with oil or glycerine, or both, said compound being of such a nature that the same, when in a liquid state, will enter into all cavities and recesses of the pattern, and when it is set a perfect counterpart of the pattern is produced. If desired, however, the mold may be prepared by other means, such as stamping or engraving, and I do not wish to confine myself to any particular method of producing the mold. After the mold has been made I pour into it a solution of glue mixed with oil or glycerine, or both, and before the solution has set, or almost immediately after the mold has been filled, I pour out the solution, leaving a layer in the mold which, when taken out, forms an exact fac-simile of the pattern, and which can be used in place of said pattern as an ornament or otherwise.

To prevent the compound from adhering to the mold when the same is made of glue or gelatinous compound, said mold may be treated with chromic acid or acetate of iron or other suitable material, and the cast articles, on being removed from the mold, may also be treated with the above acid or equivalent material.

The casts obtained by my process are flexible or elastic, and can be supported by or fastened to any suitable material, such as cloth, by laying said material on the thin layer of the compound remaining in the mold and exposing it to pressure so as to cause it to adhere thereto, and after the compound has set I draw the cloth or other material, together with the cast, out of the mold.

Thus prepared, my casts can be used with advantage on any article of wearing apparel.

If it is desired to produce a cast having an ornamental or other surface on both sides, I use two molds or dies and lay the second mold or die on the layer of the compound remaining in the first mold before the compound has set, and by applying pressure the requisite surface is produced on both sides of the cast. If the layer of compound in the first mold is backed with cloth or other material, I cast a second layer of compound on this backing and then apply the second mold or die, so as to produce a cast with a double face.

By mixing with the gelatinous compound any coloring matter casts can be obtained of any suitable color.

The compound which I use, by preference, is composed of glue, in solution, one pound; glycerine, one to five ounces; oil, (if required,) one-half to five ounces. I prefer to use linseed-oil, and the coloring matter, if such is used, is ground with the glycerine or oil and then mixed with the compound.

What I claim as new, and desire to secure by Letters Patent, is—

Flexible or elastic casts, forming fac-similes of leather, straw, enameled cloth, trimmings, embroideries, or any similar article, said cast being formed of the compound and by the means substantially as herein specified.

HENRY LOEWENBERG.

Witnesses:
W. HAUFF,
E. F. KASTENHUBER.